US005554979A

United States Patent [19]

Kohar et al.

[11] Patent Number: 5,554,979

[45] Date of Patent: Sep. 10, 1996

[54] SYSTEM FOR SETTING AMBIENT PARAMETERS

[75] Inventors: Handoko Kohar; Philippe Wegner; Léon Smit, all of Eindhoven, Netherlands

[73] Assignee: U.S. Philips Corporation, New York, N.Y.

[21] Appl. No.: 382,934

[22] Filed: Feb. 2, 1995

Related U.S. Application Data

[63] Continuation of Ser. No. 179,890, Jan. 10, 1994, abandoned, which is a continuation of Ser. No. 840,365, Feb. 24, 1992, abandoned.

[30] Foreign Application Priority Data

Feb. 27, 1991 [NL] Netherlands .......................... 9100354

[51] Int. Cl.$^6$ .......................... H04B 10/02; G08C 19/12; H04L 17/02

[52] U.S. Cl. ...................... 340/825.72; 359/142; 341/176

[58] Field of Search ...................... 340/825.06, 825.22, 340/825.57, 825.69, 825.72, 825.76; 341/21, 31, 176; 348/734; 359/142, 145, 147, 154

[56] References Cited

U.S. PATENT DOCUMENTS

| | | | |
|---|---|---|---|
| 4,091,273 | 5/1978 | Fuller et al. | 359/147 |
| 4,429,384 | 1/1984 | Kaplinsky . | |
| 4,633,247 | 12/1986 | Hegeler | 340/825.69 |
| 4,712,104 | 12/1987 | Kobayashi | 340/825.69 |
| 4,755,792 | 7/1988 | Pezzolo et al. | 340/825.06 |
| 4,827,244 | 5/1989 | Bellavia et al. | 340/825.72 |
| 4,935,733 | 6/1990 | Munekata | 340/825.72 |
| 4,965,557 | 10/1990 | Schepers et al. | 340/711 |
| 4,988,992 | 1/1991 | Heitschel et al. | 340/825.69 |
| 5,005,084 | 4/1991 | Skinner | 348/734 |
| 5,033,113 | 7/1991 | Wang | 359/142 |
| 5,062,154 | 10/1991 | Geller et al. | 359/154 |
| 5,073,979 | 12/1991 | Webb | 359/142 |
| 5,109,222 | 4/1992 | Welty | 340/825.72 |
| 5,128,667 | 7/1992 | Enomoto et al. | 340/825.72 |
| 5,309,351 | 5/1994 | McCain et al. | 340/825.72 |
| 5,382,947 | 1/1995 | Thaler et al. | 340/825.69 |

FOREIGN PATENT DOCUMENTS

| | | |
|---|---|---|
| 392872 | 4/1990 | European Pat. Off. . |
| 1520647 | 8/1978 | United Kingdom . |

OTHER PUBLICATIONS

IFS 800 Lighting Control System Brochure.
MCS-100 System; Multi-channel Infrared Transmitter; MCS 10 TH/MCS 91 WH/MCS 11 TH Brochure.

*Primary Examiner*—Alyssa H. Bowler
*Assistant Examiner*—Mark H. Rinehart
*Attorney, Agent, or Firm*—Anne E. Barschall

[57] ABSTRACT

The system comprises a plurality of objects such as lamps (11–15), venetian blinds (16, 17) and air-conditioning appliances (18) and a hand-held infrared remote control unit (40) for transmitting control signals. A separate receiver (21–28) is allocated to each one of the objects (11–18) and the transmitter of the remote control unit (40) transmits the control signals in a relatively narrow transmission beam (42). An object is selected by directing the portable transmitter (40) towards this object. Consequently, the user does not need to give a further indication of the object and the system can be operated in a simple manner. Less frequent communication with the system is possible via a separate interface unit (70). Specific objects can only be operated by certain users by transmitting an identification code along with the control signal. The identification code can also be used for the purpose of localization and for access control.

24 Claims, 4 Drawing Sheets

SYSTEM FOR SETTING AMBIENT PARAMETERS

This is a continuation of U.S. application Ser. No. 08/179,890, filed on Jan. 10, 1994, now abandoned, which is a continuation of U.S. patent application Ser. No. 07/840,365, filed on Feb. 24, 1992, now abandoned.

The invention relates to a system for setting ambient parameters such as lighting level and temperature, which system comprises one or more objects for influencing an ambient parameter and is provided with at least one portable transmitter adapted for radio transmission of a control signal, one or more receivers for receiving a control signal and a control section for selecting and setting an object. Such a system can be used, for example, for switching the lighting in a building such as an office building, a dwelling, a shop or a factory. Moreover, it is possible to control temperature, ventilation, sunshades, etc. The control section of such a system may be a central control in which all objects are connected to a single control unit. Each object may alternatively be provided with its own receiver and control unit, or the control section of the system may be a hybrid form in which objects are coupled to local control units which in their turn are coupled to a central control unit.

A system for setting the lighting level in a space or a number of spaces is known from the brochure "IFS 800 Lighting control system" of Philips Lighting and is commercially available. The known system may not only be used for lamps but also for controlling other objects for setting ambient parameters, such as fans and sunshades. In the known system the lamps and other objects are connected to a control unit via which the setting is controlled. The setting of the lamps and other objects can be adapted to the user's instantaneous wishes. To this end an infrared receiver is coupled to the control unit, which receiver receives control signals from an infrared transmitter. Using the infrared transmitter, the user sends signals to the control unit, whereafter the control unit adapts the setting to the user's wish thus expressed.

In such a system the user not only has to pass on the desired modification of the setting to the system, but he also has to indicate the object for which the modification is intended. Each object should be identified by means of an address which is to be passed along with each control signal. If the system can comprise a number of objects, it will involve a proliferation of selector keys on the portable transmitter to enable the user to give the required address information. If the system comprises a number of objects each of which has a number of possible settings, the user should know which object relates to a given key or combination of keys if he wants to use all possible settings. Incorrect use of the keys, leading to unchanged settings or to unintentionally changed settings, is certainly not impossible. The user may not only get confused, but he may also need rather extensive individual instructions for use of the portable transmitter. The addresses of the objects and the instructions for use should each time be adapted when objects are supplemented or replaced.

It is, inter alia, an object of the invention to provide a system for influencing ambient parameters for which the user does not need to know the addresses of the objects in the system.

To this end the system according to the invention is characterized in that a receiver is allocated to each object, in that the portable transmitter is adapted to generate a transmission beam having a limited cross-section, in that the control signal does not comprise address information and in that an object is exclusively selected by directing the transmission beam. With his portable transmitter the user points at an object so that this object is selected. The control signal does not comprise information indicating for which object the signal is intended.

It is to be noted that it is known per se, for example, from the brochure "MCS-100 system; Multi-channel infrared transmitter; MCS 10 TH/MCS 91 WH/MCS 11 TH" of Philips Lighting, to direct the transmission beam towards an object whose setting is to be controlled. In this system the transmitter must be directed to ensure that the receiver detects a signal of sufficient intensity, and the transmitter is not directed to select an object. The control signal in this known system comprises address information with which the object is selected. Moreover, the transmitter has a number of keys to generate this address information.

An embodiment of the system according to the invention is characterized in that the portable transmitter is provided with means for transmitting a first and a second control signal and in that the control section is provided with means for modifying the setting of an object into a first direction when the first control signal is received and for modifying the setting into the opposite direction when the second control signal is received, or for setting an object to a first state when the first control signal is received and for setting it to a second state when the second control signal is received. The portable transmitter need only have keys to indicate the modification of the setting. Only a few facilities, for example, "on" and "off", or "higher" and "lower" are required for objects influencing the ambient parameters. If there are more facilities for an object, for example, a fan having speed and temperature control, it is possible to provide receivers, arranged at some distance from one another, for each setting facility.

An attractive embodiment of the system according to the invention is characterized in that the portable transmitter is provided with means for transmitting a third control signal, in that the control section is provided with a programmable memory in which a preferential setting (preset) is stored for one or more objects and is adapted to set objects to the preferential setting when the third control signal is received. The user can then realise a personal standard setting for all objects in a simple manner.

According to the invention a further embodiment for realising preferential settings is characterized in that the system is provided with at least one extra receiver which is coupled to one or more of the objects, in that the control section is provided with a programmable memory in which a preferential setting is stored for the objects and is adapted to set objects to the preferential setting when a control signal is received by the extra receiver. A preset is thereby associated with a receiver specially provided for this purpose, rather than with one type of control signal so that separate control signals for presets are not necessary and the transmitter can be formed in a simpler manner.

A further embodiment of the system according to the invention is characterized in that the objects and the control section are coupled in a network for mutually passing on control signals. The receiver of an object can then be used to pass on information to another object. For example, in this embodiment the signals for the presets of all objects can be transmitted via a receiver and it is not necessary to send these signals to all receivers. The coupling between the objects may alternatively be utilized to modify the setting of other, for example, neighbouring objects together with the setting of a selected object. To some extent, the setting of, for example, a lamp will become dependent on the setting of another selected lamp or of a sunshade.

In this embodiment it is alternatively possible to arrange (the receivers of) different objects fairly close to each other, i.e. within the width of the transmission beam. In this embodiment it can be determined which object the transmission beam points at by checking which receiver receives the strongest control signal. When coupling the objects together, an extra control unit may be provided in the control section via the network. This extra control unit may ensure additional control and check the operation and use of the system.

This embodiment is preferably characterized in that the objects and the control section are coupled via a bus, for example a D2B bus. A bus has the advantage that it does not require separate leads for each one of the possible signal paths and all objects can be connected to a single signal lead.

A preferred embodiment of the system according to the invention is characterized in that the portable transmitter is provided with means for transmitting an identification and/or authorization code and in that the control section comprises means for selecting and setting an object also in dependence upon the identification and/or authorization code. A problem in a system with more than one user and more than one portable transmitter is that the ambient parameters set by the one user may be disturbed by another user. This is troublesome, particularly in the case of preferential settings. Due to said measure a setting or preset of an object can only be modified by means of a transmitter which is authorized for this purpose. This may be the transmitter belonging to the person who is the normal user of the space or to a manager of a part of the building or the whole building. Certain settings or objects can thus be rendered accessible to certain persons in a simple manner. For example, the lighting can be switched on with each transmitter, but the preset can only be modified by means of the transmitter belonging to the normal user of a space in a building. The change of temperature and/or the operation of sunshades may also be reserved to a single user or to the manager.

An embodiment of the system according to the invention is further characterized in that the system comprises at least one interface unit for communication with the control section, said interface unit being provided with a receiver for receiving signals transmitted by a portable transmitter. The communication facilities between the user and the system are enhanced by such an interface unit without having to give the portable transmitter a larger number of keys. This provides the possibility of combining a simple portable transmitter with a flexible setting of the system. In addition settings can be modified without using a transmitter. The interface unit may also serve as a receiver for an object or a class of objects. The system may be further characterized in that the communication with the control section is dependent on the identification and/or authorization code transmitted by a portable transmitter and received by the interface unit. The few signals which are very often used, "on"/"off", "higher"/"lower" and/or "presets" are accommodated on the transmitter, while, for example, the less frequently used signals for modifying the presets and for obtaining information from the system are implemented via the interface unit. The combination of an individual transmitter with an interface unit constitutes an individual interface having an extension of functions.

This embodiment is preferably further characterized in that the interface unit has at least a partially wireless connection with the control section. Consequently, the interface unit may be arranged at substantially any place within a space. When modifying the space, or its furnishing, the leads between the interface unit and the control section of the system need not be rearranged so that it is not necessary to take such a cumbersome and hence costly action.

The system according to the invention may be further characterized in that it comprises at least one identification unit for identifying portable transmitters and for allowing or denying access to spaces and/or services after identification. Since the portable transmitter transmits an identification code and the control section is provided with means for identifying transmitters, a portable transmitter may also be used as a key to allow or deny its user access to a space or a service. The identification unit can also be used to provide information, via the system, about the location of a portable transmitter and hence the whereabouts of its user in the building. Extra services which will then be possible are, for example, the facility of putting telephone calls directly through to the relevant space, via a telephone exchange. It is of course possible to realise an identification system based on the afore-mentioned features without influencing settings of ambient parameters by means of the transmitter. However, in that case two transmitters per person are required to achieve the same functionality as that of the system according to the invention.

These and other more detailed aspects of the invention will now be described in greater detail with reference to the accompanying drawings in which FIG. 1 shows diagrammatically a system according to the invention, with a number of objects and receivers and a transmitter;

FIGS. *5a* and *5b* show flow charts as examples of a control program for a control section.

Figure 1:
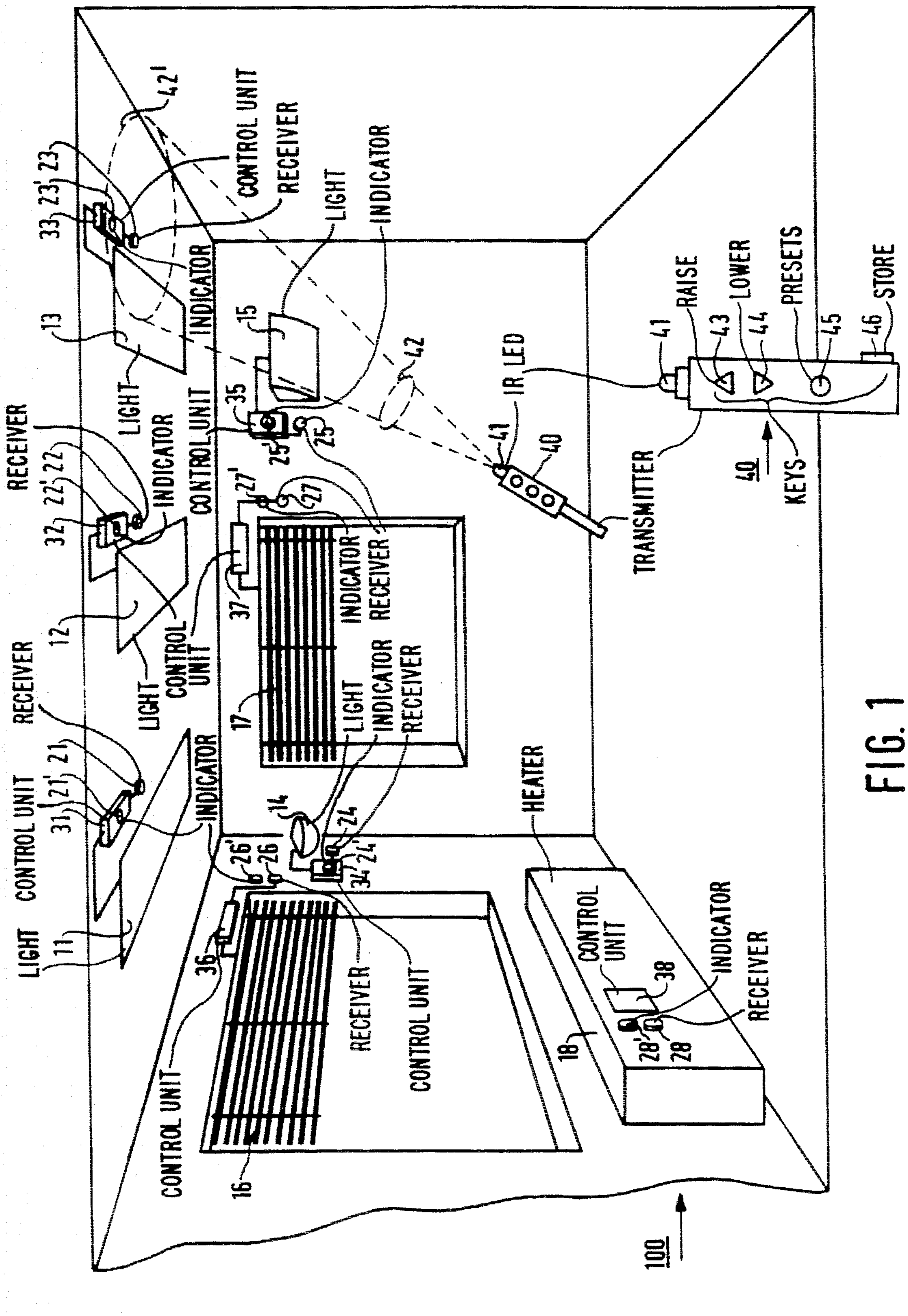

FIG. 1 shows a system according to the invention, in a space 100, for example, a room or an office accommodating a number of objects for influencing ambient parameters. There are five lighting units 11, 12, 13, 14 and 15 each provided with a receiver 21, 22, 23, 24 and 25, for example an infrared receiver, and an individual control unit 31, 32, 33, 34 and 35, respectively. There are also two sunshades or venetian blinds 16 and 17 with receivers 26 and 27 and control units 36 and 37, respectively, and a heating appliance or air-conditioning installation 18 with a receiver 28 and a control unit 38. Three lighting units are mounted on the ceiling and the other two are mounted on the walls of the space. In normal use, there will also be furniture in the space, but this is not shown in the Figure.

The system is provided with at least one portable transmitter 40 for sending control signals to the control units of the objects. The transmitter is, for example, an infrared transmitter and comprises an IR-LED 41 in which the transmitted signal is generated and three keys 43, 44 and 45 for transmitting different control signals. The transmitter transmits the control signals in a relatively narrow transmission beam 42, preferably into a direction suggested by the design of the transmitter. The width of the beam is such that the intersection of the beam 42 with a wall or ceiling covers a spot 42' within which in most cases only one of the receivers 21 to 28 is present. Thus, only one receiver at a time is activated. It is then immediately clear to the user towards which object he has directed the control signal, thus precluding an address indication that may confuse him.

Since the control signal does not comprise any address information, it is sufficient to provide the transmitter with only a few keys. The embodiment shown has four keys 43, 44, 45 and 46, with key 43 indicating the "on/higher" function, key 44 indicating the "off/lower" function, key 45 indicating the "presets" function and key 46 indicating the "store" function. When key 43 is depressed, the object receiving the control signal is switched on, or when it is already switched on, it emits more light or raises the temperature. The reverse effect is realised when key 44 is depressed. When using these control signals it is possible to distinguish, for example, between a short and a longer activation of the key. The first-mentioned action results, for example, in a maximum intensity or a fully switched-off state, while keeping a key depressed involves a gradual variation of the lighting or temperature level. The same effect is achieved with a two-state key with which a "higher" or "lower" signal is generated when it is lightly depressed and an "on/max" or "off" signal when it is further depressed.

When the "presets" key 45 is depressed, the result is that the allocated object is switched to a preprogrammed level. To change this level, it is possible to depress, for example, "presets" key 45 in combination with one of the other keys. It is possible to use a plurality of presets, for example, three settings for different circumstances by providing additional "presets" keys. To switch all objects to the preset simultaneously, one or more extra infrared light-emitting diodes (IR-LEDs) may be provided which generate a wide beam with which all receivers simultaneously receive a control signal of sufficient intensity. These IR-LEDs are activated, for example, when the keys 43, 44 and 45 are depressed simultaneously. The presets may be stored, for example, in a programmable memory present in each control unit 31 to 38 in response to a signal transmitted by the portable transmitter and activated, for example, via the "store" key 46.

Presets can alternatively be stored in the system in accordance with the following procedure. Firstly, those objects whose preset is going to be modified are brought to the level associated with the desired preset. Subsequently, those objects whose level must be stored as a preset are selected by means of a special "store" signal. Finally the level which has been set is stored under a "presets" key 45 by activating this key.

The receivers may have "direct" and "accept" indicators 21', 22', 23', 24', 25', 26', 27' and 28', respectively, for example, one or several light-emitting diodes which are arranged close to the receiver and light up when the receiver receives a signal and/or when the control command in the signal is performed.

Figure 2:
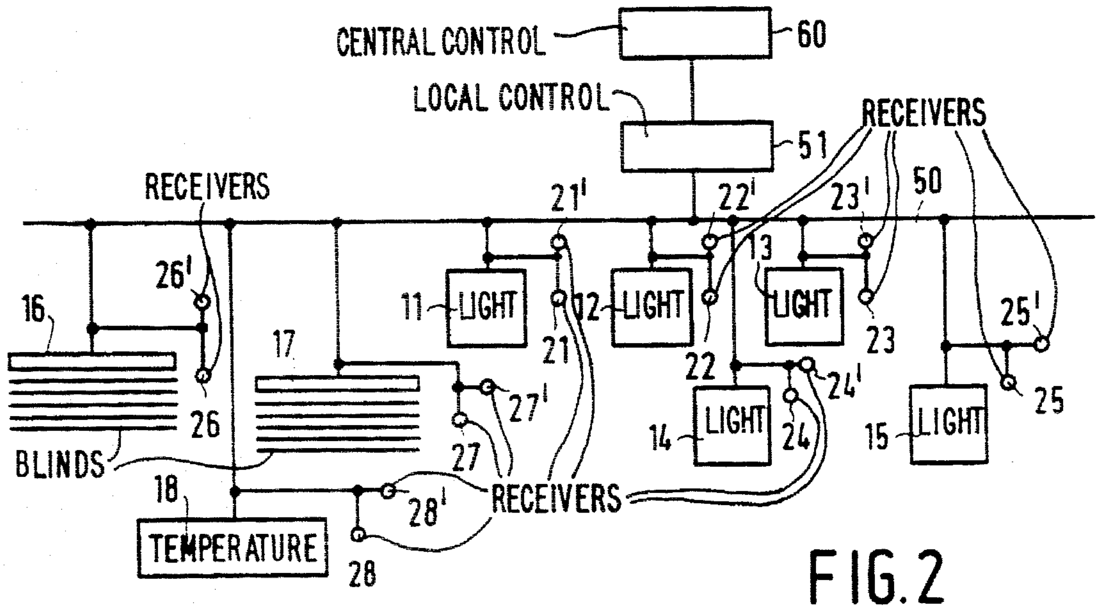
FIG. 2 shows an embodiment of the system according to the invention in which the objects are coupled together, and to a central control unit.

FIG. 2 shows diagrammatically a second embodiment of the system according to the invention. As in the previous Figure, this embodiment comprises five lighting units 11, 12, 13, 14 and 15, two venetian blinds 16 and 17 and one temperature appliance or air-conditioning installation 18. Allocated to each object are receivers 21 to 28, respectively, which are spatially arranged proximate to the objects and are, for example, constructively integrated with the objects. The objects are coupled together via a connection 50, for example, a D2B bus or another connection which is suitable for transmitting control signals. The D2B bus is described in U.S. Pat. No. 4,429,384 and is commercially available from the firm of D2B systems in Redhill, England, UK.

In addition to the control units allocated to each object, the control section of the system also comprises a local control unit 51. In its turn, the local control unit 51 may be coupled to a central control unit 60. By coupling the objects together, control signals can be passed on so that, for example, the presets of all objects can be set when the portable transmitter is directed towards the receiver of one object only. In such a case the setting of objects can also be made dependent on the setting of other objects and/or of external parameters such as the lighting level within the space and outside it, the time of day and the absence or presence of persons in the space. A system manager can register the use of the objects, detect disturbances and reprogram the control units via the coupling of the local control unit 51 to a central control unit 60.

In a practical application of the system it is undesirable that all settings, including the presets, can be modified with each portable transmitter. Restoring settings and presets which have been cancelled owing to unauthorized use is annoying and involves a considerable loss of time. To prevent unwanted modification of the settings, a portable transmitter of the system is provided with an identification code which is transmitted simultaneously with some control signals, for example, with the control signals for modifying presets. An identification code may be transmitted along with each signal.

The setting or preset is modified only when the control section of the system recognizes the identification code as being the code which is authorized for the object whose receiver has received the signal. It is of course possible to assign certain priorities in this case. For example, the instantaneous settings of all objects can be modified with each portable transmitter, but the presets cannot. The person normally using a space can modify the presets of the objects in this space. The manager of a part of a building can modify all settings and presets within this part and/or make them time-dependent, while the manager of a system or of a building can do the same for the entire building.

Since the portable transmitter does not only transmit control signals but also identification signals, the system gives the user more facilities. The simple transmitter shown in FIG. 1 can be used for the most frequent modifications which the user would like to perform. However, the system may also have a number of properties and facilities which should or may be accessible to the user. These are facilities such as rendering certain settings time-dependent and setting the temperature or the lighting level to a fixed value to which heating appliances or lighting units are adapted via a thermostat or a photosensitive cell. To make such facilities accessible to the user, the portable transmitter should be able to transmit a considerably larger number of control signals and, moreover, interaction with the system in two directions is then desirable in order to verify the instantaneous setting and check the modifications.

In accordance with the invention an easily operable transmitter is combined with the access to the extensive facilities by providing the system with a plurality of interface units. The combination of portable transmitter and interface unit provides extensive facilites. The portable transmitter then substantially only serves as an identification while the interaction with the system proceeds via the interface unit. The interface unit can also be used for selecting objects via the keys and for modifying its settings without using a portable transmitter so that the system can also be used when a portable transmitter has been forgotten or becomes defective. The identification is then realised, for example, via a PIN code (Personal Identification Number).

Figure 3:
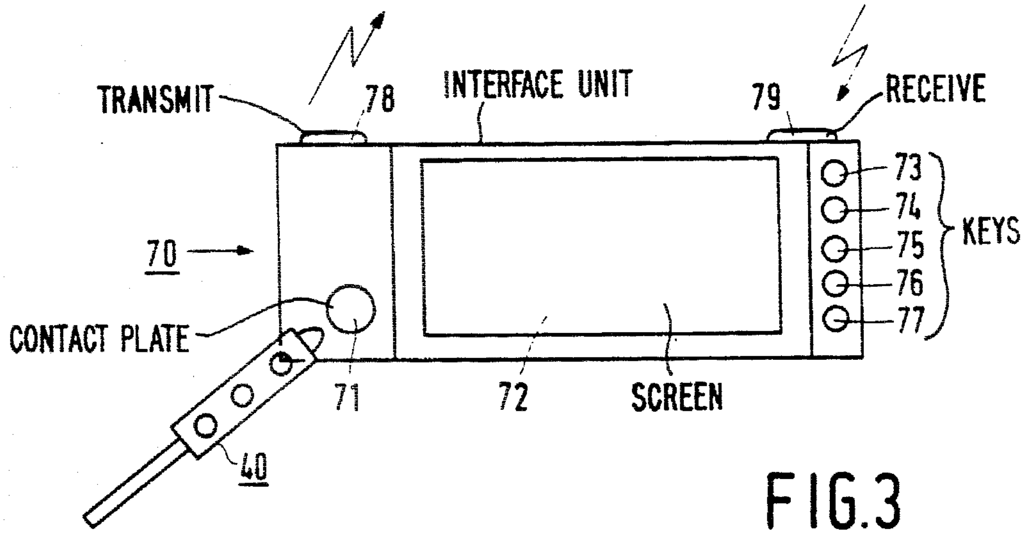
FIG. 3 shows an embodiment of an interface unit for use in a system according to the invention.

FIG. 3 shows an embodiment of an interface unit 70. The embodiment shown has a contact plate 71, a display screen 72 and a plurality of keys 73, 74, 75, 76 and 77, inter alia, a "higher" and a "lower" key. In connection with energy consumption and design the display screen 72 is an LCD screen. To realise the installation of the interface unit in a simple and flexible way, the connection between the interface unit and the control section is preferably a partially wireless connection. To this end the interface unit is provided with a transmitter 78 and a receiver 79, for example, an infrared transmitter and receiver. Other wireless connections such as radio (RF) and ultrasonic connections are of course also possible. A transmitter/receiver (not shown) is accommodated at a fixed location in the space, preferably in the ceiling. This fixed transmitter/receiver pair is coupled to the control section of the system, for example, via the bus which is provided. The energy supply of the interface unit is realised by means of, for example, a battery or a photovoltaic cell.

By directing the portable transmitter 40 towards the contact plate 71 and by transmitting signals, the interface unit is activated and a connection with the control section is established. Subsequently, the display screen shows a menu of facilities to which the owner of the transmitter 40 has access. The keys 73 to 77 are used to select facilities and modify settings.

The interface unit may further have an extra function, for example, the function of a thermostat. When used in such a function, the interface unit reacts as one of the objects in the system when the transmission beam of the portable transmitter is directed towards it. However, there may be a difference in that a reference value to which one or several objects are directed is modified instead of the direct setting of the object itself.

Figure 4:
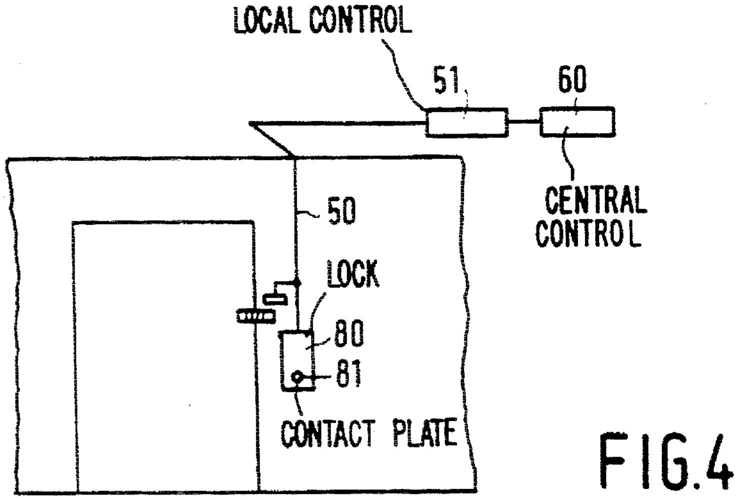
FIG. 4 shows diagrammatically an access control unit for use in a system according to the invention.

Since the portable transmitter does not only transmit control signals but also an identification code, the transmitter can be used as a key providing access to certain spaces or services. This is shown diagrammatically in FIG. 4. A "lock" 80 comprises a contact plate 81. When a portable transmitter 40 is arranged in the vicinity of the contact plate 81, an identification is passed on via a connection 50 to the control section of the system, for example, to a local or central control unit 51 or 60. After authorization in the control unit, an electromagnetic lock 82 is energized via the connection 50 so that the door 83 can be opened, allowing entry to the space shut by this door. In an analogous way the system may be coupled, for example, to data which are electronically stored and can only be read after successful identification.

A further application of transmitting identification codes by means of the portable transmitter is to inform the system of the location of a transmitter and hence the whereabouts of the user of the transmitter. This may simplify a time-consuming search of and calls for persons. An identification system as described hereinbefore may also be implemented without providing the facility of influencing ambient parameters.

Figure 5A:
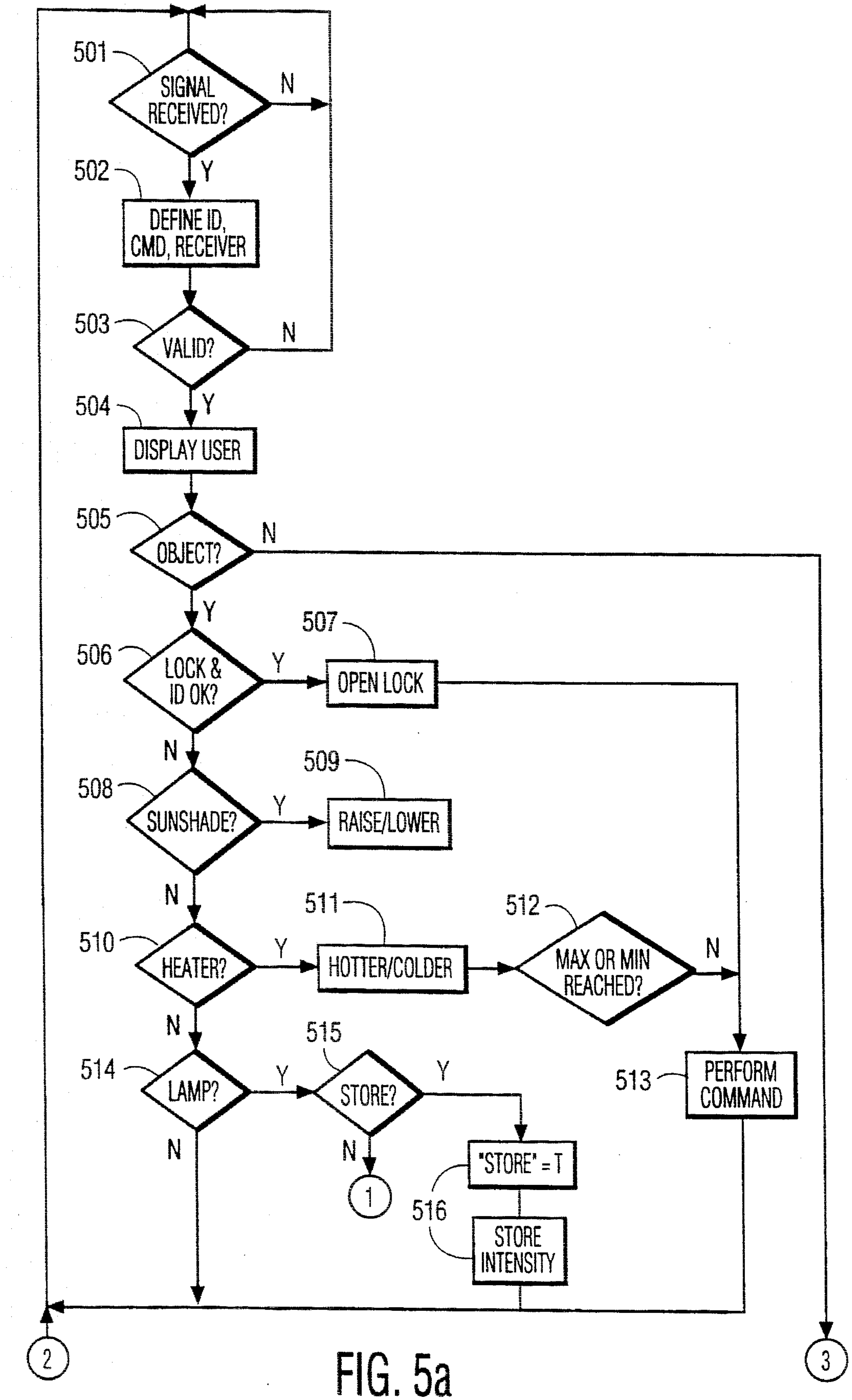
Figure 5B:
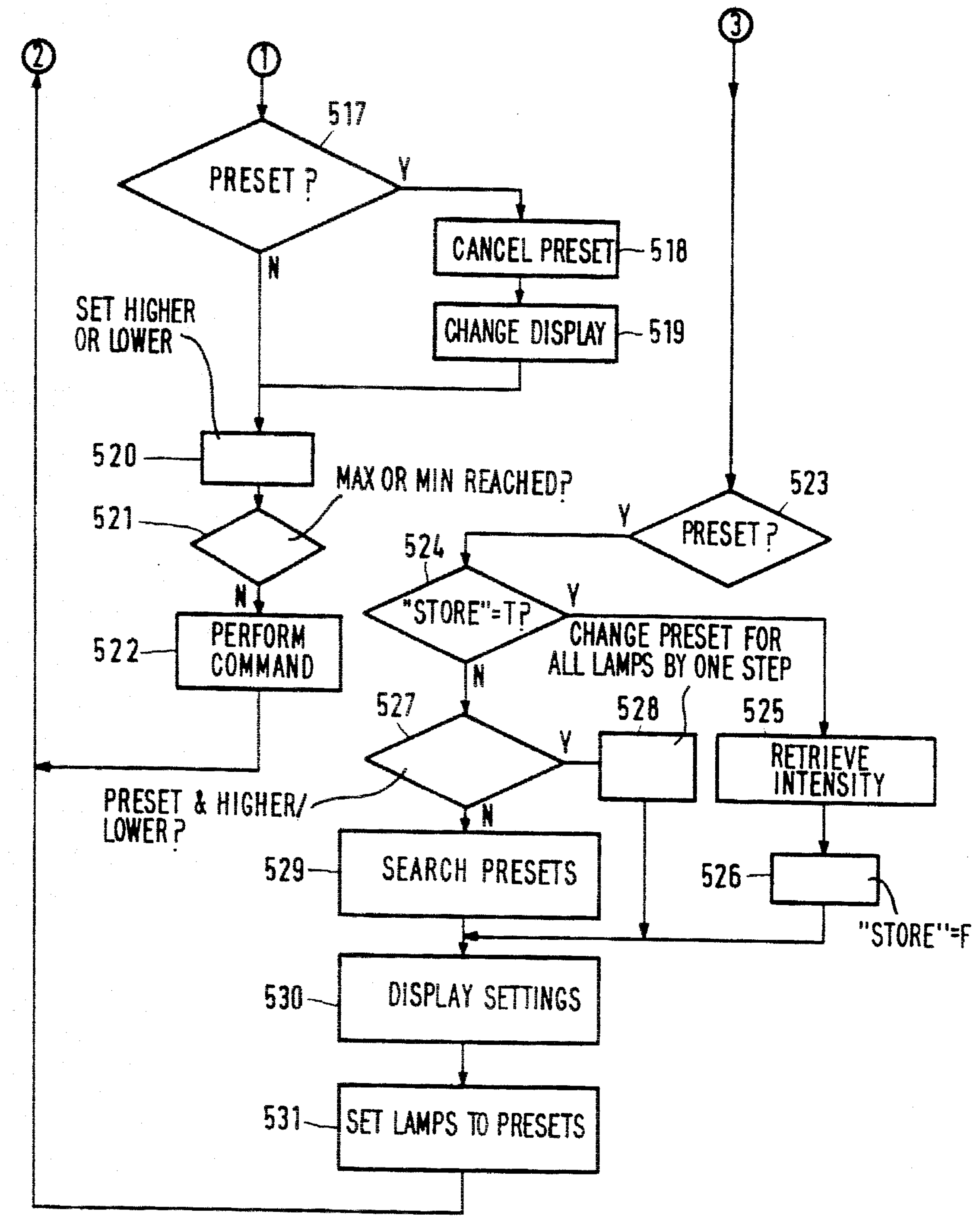

FIGS. 5*a* and 5*b* show flow charts as examples of a possible control program for the interaction between user and system. The flow chart legenda is given in the Table below.

The control program is activated as soon as one of the receivers detects a control signal in block 501. When a signal is received, the system defines the identification code (ID code) of the user, the command which it comprises and the receiver from which it originates (block 502). Subsequently it is checked whether the receiver, identification code and command are known and valid (503). If this is not the case, a malfunctioning is indicated and the program returns to the waiting loop 501.

When the tests have been performed successfully, the ID code or the user's name is displayed on the display panel of the interface unit (504). Subsequently it is checked whether the signal relates to an object or to a preset (505). If the signal relates to an object, the object is identified (506, 508,510, 514) and, dependent thereon, action is taken. If the object is a lock, the user's identity is checked and the lock is unlocked (507, 513) if the user is authorized to have access. If the object is a sunshade or a heating appliance (508, 510), it is set higher or lower (509, 511,513) dependent on the control signal, unless the maximum or minimum value has already been reached (512).

If the object is a lamp, it is further checked whether the command is "store" (515) and if this is not the case, it is checked whether the current setting has been given via a preset (517). If this is the case, the existing preset is cancelled (518) and the display on the display panel is adapted (5 19). Irrespective of the origin of the setting, this setting is subsequently controlled to a higher or lower state, unless the maximum or minimum value has already been reached (520, 521,522).

If the control signal with which the lamp has been selected comprises a "store" command, the current intensity level of the lamp is stored and an associated "store" flag is set to .TRUE. (516). Subsequently the program returns to the waiting loop (501), waiting for another control signal.

If the control signal does not directly relate to an object (505), it is first checked whether it relates to a preset (523) and, if so, whether there is a "store" flag at TRUE. (524). In the latter case the stored intensity levels are retrieved (525), the "store" flags are set to FALSE. (526), the display on the display panel is adapted to the new situation (530), and the objects are given the new presets.

If there is no "store" flag at .TRUE., as has been checked in block 524, it is checked in block 527 whether the "preset" command has been given together with a "higher" or a "lower" signal. If this is the case, the system responds by giving the entire preferential setting of all objects of one class a higher or lower value by one step (528) stored in the system. If a "preset" command has been given only, the objects are given the associated stored settings (529, 531) and the display panel is adapted to the situation (530).

TABLE

Legenda FIGS. 5a and 5b

| Block no. | Inscription |
|---|---|
| 501 | Has signal been received? |
| 502 | Define ID code, command and receiver. |
| 503 | Are ID code, command and receiver valid? |
| 504 | Display user's name or ID code on display panel. |
| 505 | Is this receiver allocated to an object? |
| 506 | Is object a "lock" and is Id code correct for this lock? |
| 507 | Open lock. |
| 508 | Is object a sunshade? |
| 509 | Raise or lower. |
| 510 | Is object a heating appliance? |
| 511 | Set hotter or colder. |
| 512 | Has maximum or minimum been reached? |
| 513 | Perform command. |
| 514 | Is object a lamp? |
| 515 | Is command "Store"? |
| 516 | Set "store" flag to ".TRUE." and store intensity level. |
| 517 | Is setting a preset? |
| 518 | Cancel preset. |
| 519 | Change message on display panel. |
| 520 | Set higher or lower. |
| 521 | Has maximum or minimum been reached? |
| 522 | Perform command. |
| 523 | Is command a preset? |
| 524 | Is "store" flag ".TRUE."? |
| 525 | Retrieve intensity level. |
| 526 | Set "store" flag to ".FALSE.", |
| 527 | Is command "preset" <u>and</u> "higher" or "lower"? |
| 528 | Change preset for all lamps by one step. |
| 529 | Search presets for this ID code. |
| 530 | Display new settings on panel. |
| 531 | Set lamps to presets. |

We claim:

1. A system for setting ambient parameters of an area, comprising:

(a) a plurality of objects in said area, each object being for influencing a respective different ambient parameter, (b) a portable control unit including:

i) a transmitter for directional transmission of a control signal in a beam having limited cross section, which control signal does not contain object addressing and identification information for any of the objects, and ii) at least one control element for specifying an influence on the respective ambient parameters, (c) a plurality of receivers, each having a respective location associated with an associated one of said objects, for receiving and responding to the control signal from said transmitter, said respective location being such as to be unambiguously distinguishable from locations of other receivers in the system by intersection with the beam, each receiver selecting and setting the associated one of the objects in response to said control signal from the transmitter, so that the associated one of the at least one object is selectable without specific object addressing identification information in said control signal.

2. The system of claim 1 wherein the control unit transmits first and second control signals; and the receiver modifies a setting selected from among one of: in a first direction and to a first state in response to the first signal; and selected from among one of: in an opposite direction and to a second state in response to the second control signal.

3. The system of claim 1 wherein the control signal includes a request to return to a preferential setting; and the receiver has a memory that stores the preferential setting and sets the associated object to the preferential setting in response to the request.

4. The system of claim 1 further comprising a further receiver coupled with one or more objects for receiving and responding to the control signal, which further receiver has a memory that stores a preferential setting and sets the coupled objects to the preferential setting.

5. The system of claim 1 wherein the objects and the receivers are coupled in a network for passing control signals amongst the objects.

6. The system of claim 5 wherein the network comprises a D2B bus.

7. The system of claim 1 wherein the control signal includes an authorization code; and the receiver selects and sets the object in dependence upon the authorization code.

8. The system of claim 1 wherein the receiver is part of an interface unit for the associated object.

9. The system of claim 7 wherein the communication between the interface unit and the associated object comprises a wireless communication.

10. The system of claim 8 further comprising at least one identification unit for identifying portable control units and for one of allowing and denying access to one of spaces and services after identification.

11. The system of claim 1 wherein at least one of the objects is a venetian blind and the respective ambient parameter for that object is light.

12. The system of claim 1 wherein at least one of the ambient parameters is temperature.

13. The system of claim 1 wherein first and second ones of the objects influence respective first and second ambient parameters, which first and second ambient parameters are different.

14. The system of claim 13 wherein the control unit has a plurality of control elements and a same one of the control elements specifies influence of both the first and second ambient parameters.

15. The system of claim 14 wherein the control elements are keys.

16. The system of claim 14 wherein a same one of the control elements increases the first ambient parameter when the first object is selected and increases the second ambient parameter when the second object is selected.

17. The system of claim 14 wherein a same one of the control elements decreases the first ambient parameter when the first object is selected and decreases second ambient parameter when the second object is selected.

18. The system of claim 1 wherein at least one of the objects is a door lock.

19. The system of claim 14 wherein a same one of the control elements sets the first ambient parameter to a first respective preset when the first object is selected and sets the second ambient parameter to a second respective preset when the second object is selected.

20. The system of claim 13 wherein the first ambient parameter is light and the second ambient parameter is temperature.

21. The system of claim 12 wherein the object is an air conditioner.

22. The system of claim 13 wherein the object is a heater.

23. A system for setting ambient parameters of an area, comprising:

a first object controlling a first ambient parameter;

a first receiver locationally associated with and coupled to said first object and controlling the first object responsive to a single universal control signal;

a second object controlling a different second ambient parameter;

a second receiver locationally associated with and coupled to said second object and controlling the second object responsive to the single universal control signal;

a transmitter producing the single universal control signal capable of controlling the first and second objects and having a directional beam used to select between the first and second objects.

24. A system as recited in claim 23, wherein the single universal control signal does not include object identification information.

* * * * *